United States Patent
Dharanikota et al.

(10) Patent No.: US 8,069,475 B2
(45) Date of Patent: Nov. 29, 2011

(54) DISTRIBUTED AUTHENTICATION FUNCTIONALITY

(75) Inventors: Sudheer Dharanikota, Cary, NC (US); Luc Absillis, Raleigh, NC (US); Gopal Surya, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1100 days.

(21) Appl. No.: 11/217,827

(22) Filed: Sep. 1, 2005

(65) Prior Publication Data

US 2007/0050839 A1   Mar. 1, 2007

(51) Int. Cl.
  *H04L 29/08* (2006.01)
(52) U.S. Cl. .............. 726/7; 398/72; 713/168; 709/225
(58) Field of Classification Search .................. None
  See application file for complete search history.

(56) References Cited

U.S. PATENT DOCUMENTS

| | | | | |
|---|---|---|---|---|
| 6,055,637 | A * | 4/2000 | Hudson et al. ................. | 726/20 |
| 7,424,024 | B2 * | 9/2008 | Chen et al. ..................... | 370/401 |
| 2003/0065787 | A1 * | 4/2003 | Osafune et al. ............... | 709/227 |
| 2003/0237002 | A1 * | 12/2003 | Oishi et al. ..................... | 713/201 |
| 2004/0062256 | A1 * | 4/2004 | Takeuchi et al. .............. | 370/401 |
| 2004/0073788 | A1 * | 4/2004 | Kim et al. ...................... | 713/160 |
| 2004/0179521 | A1 * | 9/2004 | Kim et al. ...................... | 370/384 |
| 2004/0255118 | A1 | 12/2004 | Shin et al. | |
| 2005/0053376 | A1 * | 3/2005 | Joo et al. ......................... | 398/72 |
| 2005/0069317 | A1 * | 3/2005 | Lee et al. ........................ | 398/67 |
| 2006/0129814 | A1 * | 6/2006 | Eun et al. ...................... | 713/168 |
| 2006/0176835 | A1 * | 8/2006 | Jang et al. ..................... | 370/270 |
| 2006/0203842 | A1 * | 9/2006 | Wollmershauser et al. .. | 370/463 |
| 2007/0025734 | A1 * | 2/2007 | Oogushi et al. ................ | 398/71 |
| 2007/0064719 | A1 * | 3/2007 | Tanaka .......................... | 370/437 |
| 2008/0247550 | A1 * | 10/2008 | Kozaki et al. ................. | 380/278 |
| 2008/0285972 | A1 * | 11/2008 | Takeuchi et al. .............. | 398/60 |

FOREIGN PATENT DOCUMENTS

| | | |
|---|---|---|
| EP | 1458164 A2 * | 9/2004 |
| WO | 2005060208 A1 | 6/2005 |

OTHER PUBLICATIONS

Roh, et al.; Design of Authentication and Key Exchange Protocol in Ethernet Passive Optical Networks; ICCSA 2004; pp. 1035-1043; Section 3.1.
Ken Murakami; Authentication and Encryption in EPON; IEEE 802.3ah P2MP, Jul. 2002, Presentation Materials; IEEE 802.3ah Ethernet in the 1st Mile Task Force Retrieved from the internet: http://www.ieee802.org/3/efm/public/jul02/p2mp/murakami_p2mp_1_0702.pdf.

* cited by examiner

*Primary Examiner* — Nathan Flynn
*Assistant Examiner* — Michael R Vaughan
(74) *Attorney, Agent, or Firm* — Galasso & Associates, LP

(57) ABSTRACT

A Passive Optical Network (PON) includes an Optical Network Terminal (ONT) and an Optical Line Terminal (OLT). The ONT is configured for providing controlled port operations of authenticator Port Access Entity (PAE) functionality and the OLT is configured for providing entity authentication operations of the authenticator PAE functionality. The controlled port operations of authenticator PAE functionality includes inhibiting transmission of non-authentication messages from the ONT, transmitting a supplicant authentication request to the OLT and enabling transmission of non-authentication messages from the ONT in response to receiving supplicant authentication confirmation. The entity authentication operations of the authenticator PAE functionality include facilitating authentication of an identity of the supplicant and facilitating transmission of supplicant authentication confirmation for reception by the ONT in response to the identity being authenticated.

13 Claims, 4 Drawing Sheets

DISTRIBUTED AUTHENTICATION FUNCTIONALITY

FIELD OF THE DISCLOSURE

The disclosures made herein relate generally to facilitating authentication functionality in a data network and, more particularly, to facilitating authentication functionality in a Passive Optical Network using IEEE 802.1X standard.

BACKGROUND

The 802.1X standard (i.e., 802.1X) of the Institute of Electrical & Electronics Engineers (IEEE) is a standard for facilitating network access control. It offers an effective framework for authenticating and controlling user traffic in data networks such as, for example, a Passive Optical Networks (PON), a WiFi wireless network and the like. The underlying functionality of 802.1X is that it keeps a network port disabled (e.g., to a certain type of traffic) until authentication is completed. Such a network port, which is under control of 802.1X, is referred to herein as the controlled port. Depending on the results, the controlled port is either made available to all traffic or remains disabled for at least a portion of traffic.

802.1X uses Extensible Authentication Protocol (EAP) for passing authentication messages. "EAP Over LAN" (EAPoL) is specifically configured for packet networks such as Ethernet. 802.1X uses EAPoL to start and end an authentication session and pass EAP messages between a supplicant and an authenticator and from the supplicant to an authentication server via the authenticator. Remote Authentication Dial In User Service (RADIUS) protocol is a typical protocol used for sending EAP messages from the authenticator to the authentication server. The supplicant is an entity (e.g., a user or client) requesting access to a network, the authenticator is the network device (e.g., an access point (AP), an network access server (NAS) or the like) that provides the network port to the supplicant and the authentication server is the server that provides authentication. In some networks (e.g., relatively small networks), the authentication server is often located in the same network element as the authenticator.

In a conventional manner, initial 802.1X authentication functionality begins with a supplicant attempting to connect with an authenticator. The authenticator responds by enabling a port (i.e., a controlled port) for passing only EAP packets from the client to an authentication server. The authenticator blocks all other traffic, such as HTTP, DHCP, and POP3 packets, until the authenticator can verify the supplicant's identity. The authenticator interacts with an authentication server for facilitating authentication of the supplicant's identity. Once the supplicant's identity is successfully authenticated, the authenticator opens the controlled port for other types of traffic.

Conventional approaches for implementing authentication via 802.1X are limited in that full functionality is too costly and too complex for low power, low cost devices. For example, an Optical Network Terminal (ONT) of a PON is intentionally designed as a relatively low-cost, low-power device with relatively high data plane packet processing functionality and with relatively limited control plane functionality. Accordingly, running full authenticator Port Access Entity (PAE) functionality on a ONT via 802.1X would require a host IP stack on the ONT with RADIUS client functionality, thereby necessitating stringent security and processing power requirements at the ONT as well as increasing cost and complexity of the ONT.

Therefore, an approach for enabling cost efficient implementation of authentication via 802.1X in a relatively low power, low cost device would be useful and advantageous.

SUMMARY OF THE DISCLOSURE

Embodiments of the present invention provide for cost efficient implementation of 802.1X authenticator function in a low power, low cost device such as an Optical Network Terminal (ONT) of a Passive Optical Network (PON), leaving the detailed 802.1X processing to the relatively more expensive and more intelligent Optical Line Terminal (OLT) of the PON. The present invention relies upon decomposition of 802.1X authenticator functionality into functional blocks that can be implemented on distinct network elements with, for example, a tunneling protocol to transparently send information between the functional blocks over a communication link. Because an ONT is tightly coupled to the OLT serving a PON, the authenticator Port Access Entity (PAE) functionality can be effectively and efficiently distributed between the ONT and the OLT. In this distributed arrangement, the ONT is responsible for the implementation of a controlled port state machine (i.e., to accept or deny packets from a port) and the OLT is responsible for the remainder of authenticator PAE functions, including local or remote entity identity authentication (e.g., supplicant identity authentication). Implementation of the controlled port functionality on the ONT is provided in a relatively simple manner, while 802.1X security is enforced at the ONT. In doing so, embodiments of the present invention advantageously overcome the limitations associated with implementing 802.1X authenticator functionality via a relatively low power, low cost device such as an ONT.

In one embodiment of the present invention, a method comprises inhibiting transmission of non-authentication messages from an ONT of a PON until an identity of an entity seeking to send said non-authentication messages is authenticated, authentication request from the ONT for reception by an OLT of the PON and enabling transmission of non-authentication messages from the ONT in response to receiving entity authentication confirmation by the ONT for the entity. Inhibiting transmission of non-authentication messages from the ONT and enabling transmission of non-authentication messages from the ONT are performed by the ONT.

In another embodiment of the present invention, a PON comprises an ONT and an OLT. The ONT includes at least one data processing device, memory connected to the at least one data processing device and ONT instructions accessible from the memory and processable by the at least one data processing device of the ONT. The ONT instructions are configured for enabling the at least one data processing device of the ONT to facilitate inhibiting transmission of non-authentication messages from the ONT until an identity of an entity seeking to send said non-authentication messages is authenticated and enabling transmission of non-authentication messages from the ONT in response to receiving entity authentication confirmation for the entity.

In another embodiment of the present invention, a PON comprises an ONT configured for providing controlled port operations of authenticator PAE functionality and an OLT configured for providing entity authentication operations of the authenticator PAE functionality. The ONT and OLT are interconnected for enabling interaction therebetween.

Turning now to specific aspects of the present invention, in at least one embodiment, a PON further comprises an OLT including at least one data processing device, memory connected to the at least one data processing device of the OLT and OLT instructions accessible from the memory and processable by the at least one data processing device of the OLT. The OLT instructions are configured for enabling the at least one data processing device of the OLT to facilitate authenticating an identity of the entity and transmitting entity authentication confirmation in response to the identity being authenticated.

In at least one embodiment of the present invention, inhibiting transmission of non-authentication messages from the ONT and enabling transmission of non-authentication messages from the ONT are performed by the ONT.

In at least one embodiment of the present invention, a method and instruction in accordance with the present invention are each configured for authenticating an identity of the entity and transmitting an entity authentication confirmation for reception by the ONT in response to the identity being authenticated.

In at least one embodiment of the present invention, authenticating the identity of the entity and the transmitting the entity authentication confirmation are performed by at least one of the OLT and an authentication server.

In at least one embodiment of the present invention, transmitting the entity authentication request and transmitting the entity authentication confirmation each include at least one of transmitting Extensible Authentication Protocol (EAP) messages over a dedicated tunnel between the ONT and the OLT, and transmitting EAP messages in a data path including EAP messages and non-EAP messages and extracting the EAP messages from the data path.

In at least one embodiment of the present invention, a method and instruction in accordance with the present invention are each configured for directing the entity authentication request to authenticator PAE functionality for enabling the authenticating the identity of the entity to be performed.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1A:
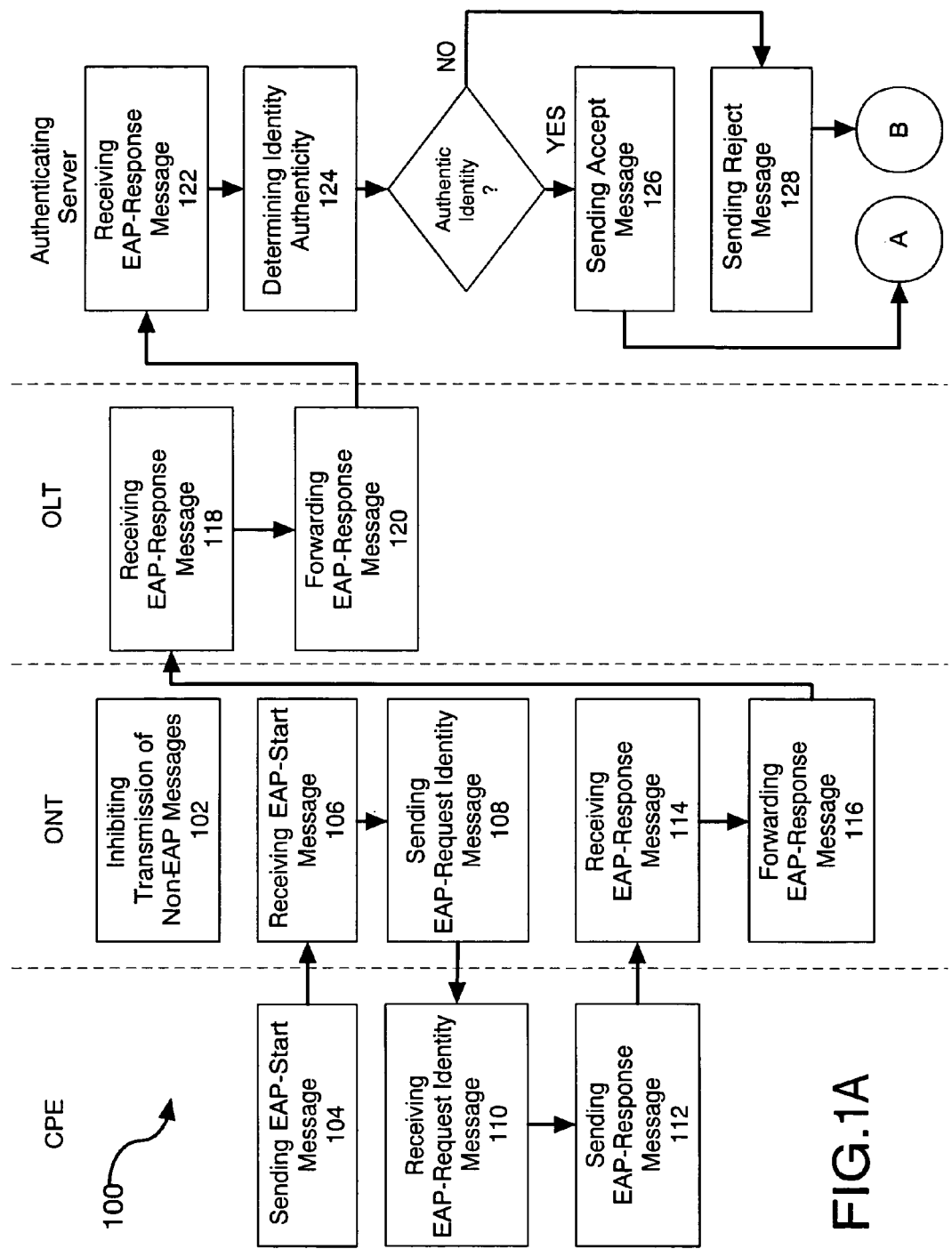
FIGS. 1A-1C jointly depict an embodiment of a method for facilitating authentication PAE functionality in accordance with the present invention.
Figure 1B:
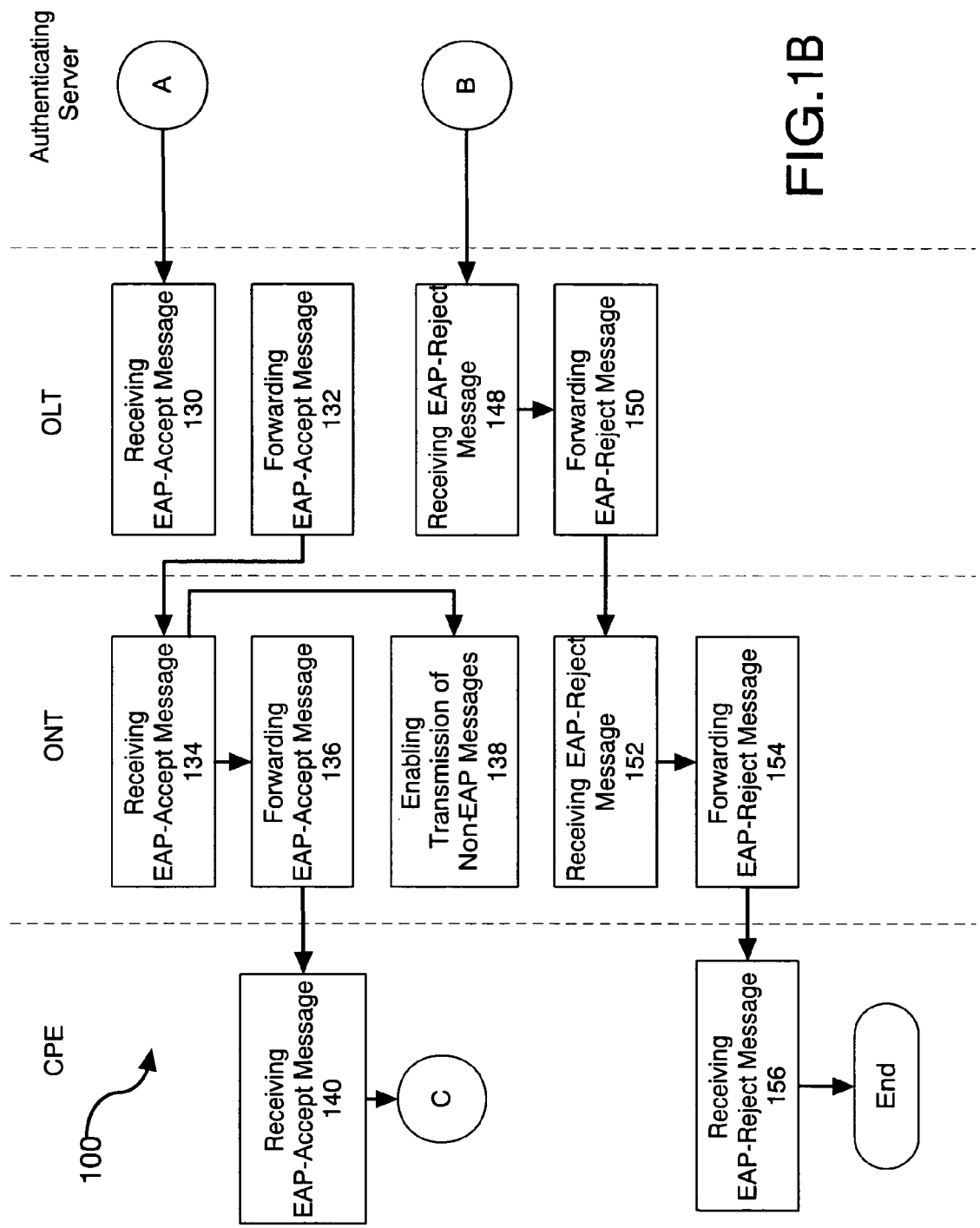
Figure 1C:
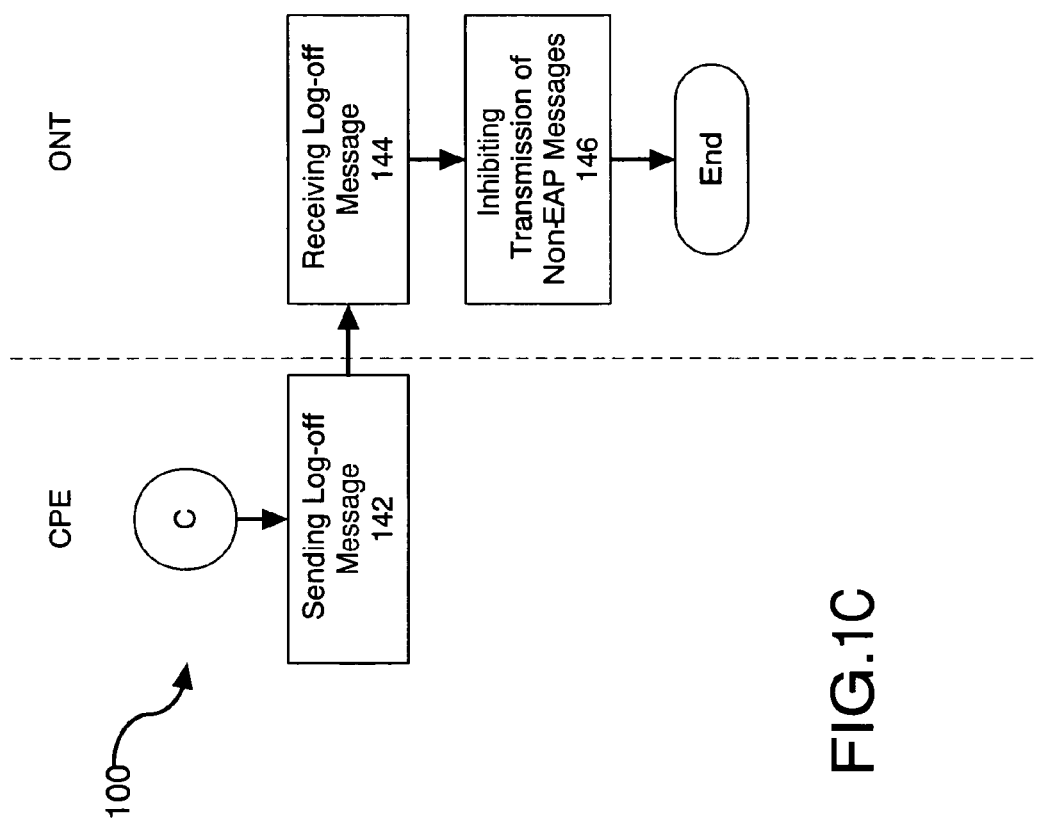

FIGS. 1A-1C depict a method in accordance with the present invention, which is referred to herein as the method 100. The method 100 is configured for carrying out IEEE 802.1X authenticator PAE functionality in a distributed arrangement. In this distributed arrangement, an ONT of a PON is responsible for the implementation of the controlled port state machine (i.e., to accept or deny packets from a port) and an OLT of the PON, which is connected to the ONT, is responsible for the remainder of authenticator PAE functions, including local or remote entity identity authentication (e.g., supplicant identity authentication). Accordingly, the method 100 advantageously enables controlled port operations of 802.1X authenticator functionality to be implemented via an ONT, which is a relatively low power, low cost device.

An ONT is connected to the OLT through a PON fiber infrastructure. The ONT provides Ethernet port connectivity at a subscriber premise. In this manner, the ONT provides customer premise equipment (CPE) such as, for example, a personal computing system with network connectivity. It is disclosed herein that an ONT in accordance with the present invention may be a single-family unit ONT or a multi-dwelling unit ONT. It is also disclosed herein that the present invention is not limited to implementation via a specific type or brand of ONT. In view of the disclosures made herein, a skilled person will appreciate that the present invention can be applied to any number of different types and/or brands or ONT's.

Referring now to FIG. 1A, the method 100 is initiated with an ONT performing an operation 102 for inhibiting transmission of non-EAP Messages on a controlled port of the ONT. To this end, the ONT drops all non-EAP messages on the controlled port of the ONT until the controlled port is successfully authenticated. It is disclosed herein that Messages in accordance with the present invention may be comprised of one or more packets or other type of data transmission units.

CPE, at the control of a supplicant, performs an operation 104 for sending an EAP-Start Message for reception by a connected ONT. The operation 104 for sending the EAP-Start Message includes facilitating preparation of the EAP-Start Message. The EAP-Start Message includes information that communicates the CPE's desire to transmit and/or receive non-EAP messages via the controlled port of the ONT.

In response to the ONT performing an operation 106 for receiving the EAP-Start Message, the ONT performs an operation 108 for sending an EAP-Request Identity message for reception by the CPE. The operation 108 for sending the EAP-Request Identity Message includes facilitating preparation of the EAP-Request Identity Message. The EAP-Request Identity Message includes information communicating a request for supplicant authentication information (e.g., a username and passcode).

In response to the CPE performing an operation 110 for receiving the EAP-Request Identity Message, the CPE performs an operation 112 for sending an EAP-response Message (i.e., a supplicant authentication request) for reception by the ONT. The operation 112 for sending the EAP-Response Message includes facilitating preparation of the EAP-Response Message. The EAP-Response Message includes the requested supplicant authentication information.

In response to the ONT performing an operation 114 for receiving the EAP-Response Message, the ONT performs an operation 116 for forwarding the EAP-Response Message for reception by an OLT that serves the ONT. The term transmitting is defined herein to include sending and forwarding. However, forwarding generally entails sending a message that is not prepared by the device that sends it. The OLT performs an operation 118 for receiving the EAP-response message and, thereafter, performs an operation 120 for forwarding the EAP-Response Message for reception by an Authentication Server.

The Authentication Server performs an operation 122 for receiving the EAP-Response Message. With the information contained in the EAP-Response Message (e.g., credentials of the supplicant) and information (e.g., known-authentic supplicant credentials) that is maintained on the Authentication Server, the Authentication Server performs an operation 124 for determining identity authenticity of the supplicant. In determining the identity authenticity of the supplicant, the authentication server verifies the credentials of the supplicant on behalf of the OLT (i.e., the authenticator). If the identify of the supplicant is determined to be authentic, the Authenticating Server performs an operation 126 for sending an Accept Message (i.e., entity authentication confirmation) for reception by the CPE via the OLT and ONT. If the identify of the supplicant is determined to be non-authentic or otherwise non-authenticable, the Authenticating Server performs an operation 128 for sending a Reject Message for reception by the CPE via the ONT and the OLT.

A backend server configured with Remote Authentication Dial In User Service (RADIUS) functionality is an example of the Authentication Server. It is disclosed herein that identity authentication in the manner disclosed above may be implemented with a RADIUS Server. It is also disclosed herein that communication between the OLT and a backend authentication server such as a RADIUS server may be performed using "EAP over RADIUS protocol" encapsulation.

Referring now to FIG. 1B, in the case of the identify of the supplicant being determined to be authentic and the Authenticating Server sending the Accept Message for reception by the CPE via the OLT and the ONT, the OLT performs an operation 130 for receiving the EAP-Accept Message and, thereafter, performs an operation 132 for forwarding the EAP-Accept Message for reception by the ONT. In response to performing an operation 134 for receiving the EAP-Accept Message, the ONT perform an operation 136 for forwarding the EAP-Accept Message for reception by the CPE and performs an operation 138 for enabling transmission of non-EAP Messages at the controlled port of the ONT. The CPE performs an operation 140 for receiving the EAP-Accept Message, thereby enabling entity authentication confirmation to be presented to the supplicant via the CPE.

As depicted in FIG. 1C, at some point after the ONT enables transmission of non-EAP Messages at the controlled port of the ONT, the CPE performs an operation 142 for sending a Log-off Message for reception by the ONT. For example, the Log-off Message may be sent at the request of the supplicant or may be sent after a prescribed period of inactivity (i.e., after a prescribed period of without any non-EAP traffic) on the controlled port. In response to performing an operation 144 receiving the Log-off Message, the ONT performs an operation 146 for inhibiting transmission of non-EAP messages, at which point the method 100 ends with the ONT awaiting authentication of the identity of the same or another supplicant such that non-EAP messages may be communicated via the controlled port.

It is disclosed herein that, optionally, the operation 142 for sending the Log-off Message is performed by the OLT (i.e., an Authenticator) or by the Authentication Server. For example, the Authenticator or the Authentication Server may send the Log-off Message after a prescribed period of inactivity (i.e., after a prescribed period of without any non-EAP traffic) on the controlled port, in response to a request from a system administrator received by the authenticator, in response to a prescribed security-breach condition being identified on the controlled port, etc.

Referring back to FIG. 1B, in the case of the identity of the supplicant being determined to be non-authentic or otherwise non-authenticable and the Authenticating Server sending the Reject Message for reception by the CPE via the ONT and the OLT, the OLT performs an operation 148 for receiving the EAP-Reject Message and, thereafter, performs an operation 150 for forwarding the EAP-Reject Message for reception by the ONT. In response to performing an operation 152 for receiving the EAP-Reject Message, the ONT perform an operation 154 for forwarding the EAP-reject Message for reception by the CPE. The CPE performs an operation 156 for receiving the EAP-Reject Message, thereby enabling non-authentication acknowledgement to be presented to the supplicant via the CPE, at which point the method 100 ends.

It is disclosed herein that an Authentication Server in accordance with the present invention may be a functional component of the OLT (i.e., the Authenticator) providing for local authentication functionality or may be a separate network element from the OLT providing for remote authentication functionality (e.g., a RADIUS Server). In either case, the Authentication Server holds information (i.e., known authentic supplicant credentials) necessary for authenticating the credentials of one or more supplicants. The known authentic supplicant credentials are compared against supplicant authentication information for determining authenticity of the supplicant authentication information.

It is disclosed herein that, optionally, the OLT (i.e., an Authenticator) performs the operation 104 for sending the EAP-Start Message, the operation 110 for receiving the EAP-Request Identity Message and the operation 112 for sending the EAP-Response Message. The Authenticator may perform such operations for enabling certain traffic to be received by the ONT without the ONT first enabling such non-EAP traffic. Examples of situations in which it may be necessary for the Authenticator to enable the flow of non-EAP traffic on the controlled port include, but are not limited to, delivery of traffic from a system administrator and delivery of traffic from other authorized entities. Where the Authenticator performs such operations, it is the identity of the Authenticator (e.g., an authorized entity acting through the Authenticator) that is being authenticated and confirmed rather than the identity of a Supplicant.

Figure 2:
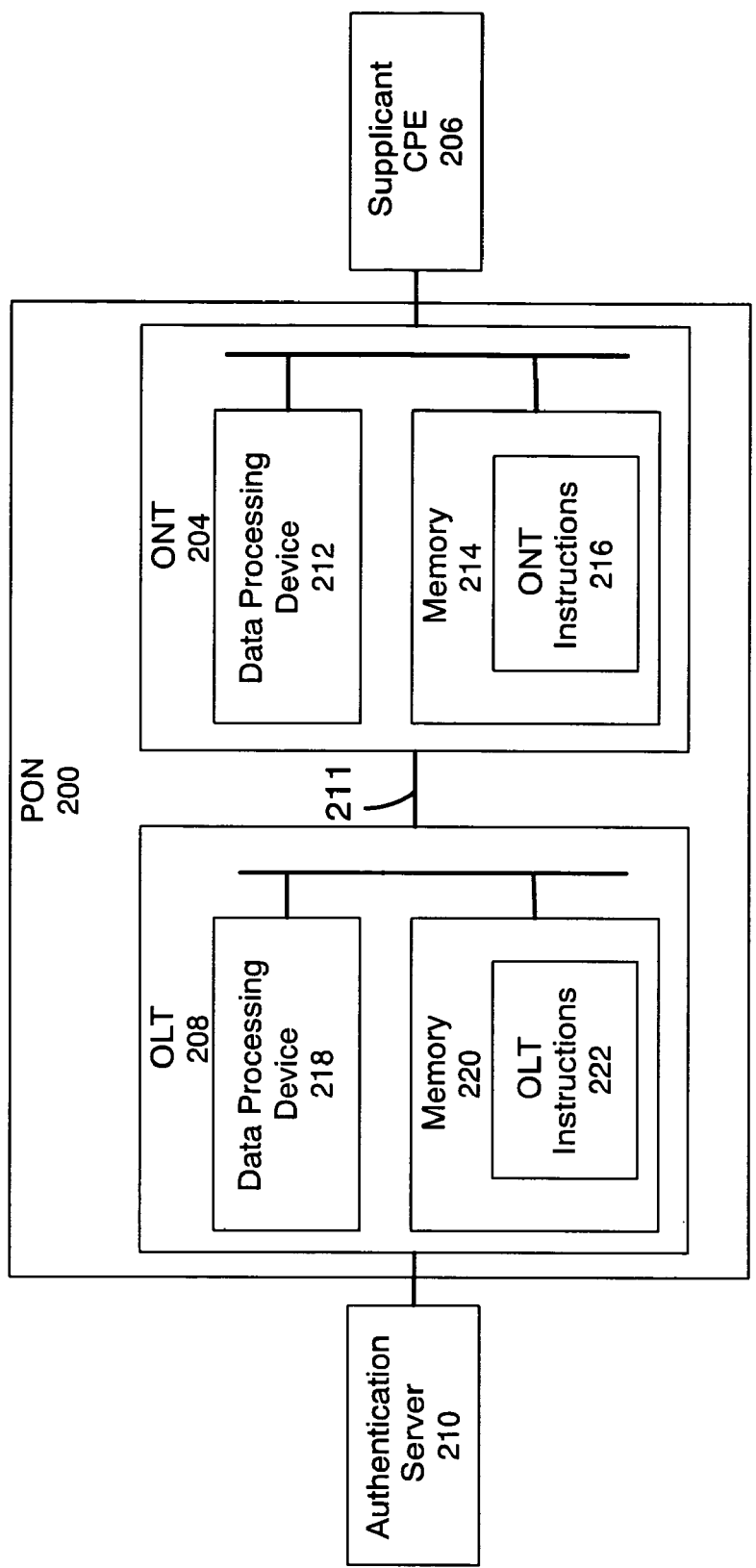
FIG. 2 depicts an embodiment of a Passive Optical Network configured in accordance with the present invention.

FIG. 2 depicts an embodiment of a PON in accordance with the present invention, which is referred to herein as the PON 200. The PON 200 is configured for carrying out authentication functionality as disclosed above in reference to the method 100 of FIGS. 1A-1C. The PON 200 includes an ONT 204 and an OLT 208. The ONT has supplicant CPE 206 (e.g., a personal computing system) connected thereto and the OLT 208 has an Authentication Server 210 connected thereto (i.e., an Application Server separate from the OLT 208). The ONT 204 is connected to the OLT 208 by a communication link 211. Accordingly, messages may be communicated between the ONT 204, the CPE 206, the OLT 208 and the Authentication Server 210.

The ONT 204 includes a data processing device 212, memory 214 connected to the data processing device 212 of the ONT 204 and ONT instructions 216 accessible from the memory 214 and processable by the data processing device 212 of the ONT 204. The ONT instructions 216 are configured for, among other functionalities, enabling the data processing device 212 to facilitate controlled port operations of authenticator Port Access Entity (PAE) functionality. In a preferred embodiment, such controlled port operations include, but are not limited to, inhibiting transmission of non-authentication messages from the ONT 204, transmitting a supplicant authentication request from the ONT 204 for reception by the OLT 208, and enabling transmission of non-authentication messages from the ONT 204 in response to receiving an entity authentication confirmation from the OLT 208.

The OLT 208 includes a data processing device 218, memory 220 connected to the data processing device 218 of the OLT 208 and ONT instructions 222 accessible from the memory 220 and processable by the data processing device 218 of the OLT 208. The OLT instructions 222 are configured for, among other functionalities, enabling the data processing device 212 to facilitate entity authentication operations of the authenticator PAE functionality. In a preferred embodiment, such entity authentication operations include, but are not limited to, authenticating an identity of the supplicant and transmitting an entity authentication confirmation for reception by the CPE 206 via the OLT 208 and the ONT 204 in response to the identity being authenticated.

It is disclosed herein that EAP Messages may be communicated between the ONT 204 and the OLT 208 on the communication link 211 by at least two different approaches. In a first approach, the communication link 211 is a pre-established (e.g., dedicated) tunnel and EAP messages are communicated between the ONT 204 and the OLT 208 on the pre-established tunnel. For example, on Ethernet using EAP over LAN (EAPoL) encapsulation, EAP messages are forwarded from the ONT 204 to the OLT 208 on the pre-established tunnel. In the case of BPON technology, this tunnel can be separate Private Virtual Connection (PVC) per ONT for EAP traffic. EAP messages being transmitted from the ONT 204 to the OLT 208 on the pre-established tunnel are redirected to the PAE functions on the OLT 208. Similarly, EAP messages to the supplicant CPE 206 are inserted by the OLT 208 on the tunnel between the ONT 204 and the OLT 208. In a second approach, EAP messages are forwarded in the same data tunnel as non-EAP messages. A filtering mechanism is implemented on both the ONT 204 and the OLT 208 for enabling extraction of the EAP messages from a data path that includes non-EAP messages. EAP messages from the ONT 204 to the OLT 208 that are extracted from the data tunnel are redirected to the PAE functions on the OLT 208. Similarly, EAP messages to the Supplicant CPE 206 user are inserted by the OLT 208 into the data path of data tunnel between the ONT 204 and the OLT 208.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
inhibiting transmission of non-authentication messages until an identity of an entity seeking to send said non-authentication messages is authenticated;
enabling transmission of non-authentication messages in response to receiving an entity authentication confirmation to an entity authentication request; and
authenticating the identity of the entity wherein said authenticating is performed by at least one Optical Line Terminal (OLT) and an authentication server, which cooperates with the OLT wherein the OLT plays an active role in authenticating the identity of the entity; characterized in that said inhibiting transmission of non-authentication messages is performed by an Optical Network Terminal (ONT) and said enabling transmission of non-authentication messages is performed by the ONT and the ONT and wherein the entity, at the control of a supplicant, sends an EAP-Start Message for reception by the connected ONT;
in response to the ONT receiving the EAP-Start Message, the ONT sends an EAP-Request Identity Message for reception by the entity;
in response to the entity receiving the EAP-Request Identity Message, the entity sends an EAP-Response Message;
in response to the ONT receiving the EAP-Response Message, the ONT forwards the EAP-Response Message for reception by the OLT that serves the ONT;
the OLT receives the EAP-Response Message and then forwards the EAP-Response Message for reception by the authentication server;
the authentication server receives the EAP-Response Message and determines the identity authenticity of the supplicant;
if the identity of the supplicant is determined to be authentic, the authentication server sends an Accept Message for reception by the entity via the OLT and the ONT;
if the identity of the supplicant is determined to be non-authentic, the authentication server sends a Reject Message for reception by the entity via the OLT and the ONT;
in the case of the identity of the supplicant being determined to be authentic and the authentication server sending the Accept Message for reception by the entity via the OLT and the ONT, the OLT receives the Accept Message and then forwards the Accept Message for reception by the ONT and the ONT forwards the Accept Message for reception by the entity and enables transmission of non-EAP Messages at a controlled port of the ONT and the entity receives the Accept Message while the entity sends a Log-off Message for reception by the ONT at some point after the ONT enables transmission of non-EAP Messages to the controlled port of the ONT and in response to receiving the Log-off Message, the ONT inhibits transmission of non-EAP messages; and
in the case of the identity of the supplicant being determined to be non-authentic and the authentication server sending the Reject Message for reception by the entity via the OLT and the ONT, the OLT receives the Reject Message and forwards the Reject Message for reception by the ONT and the ONT forwards the Reject Message for reception by the entity.

2. The method of claim 1 wherein transmitting the entity authentication request and transmitting said entity authentication confirmation each include at least one of:
transmitting Extensible Authentication Protocol (EAP) messages over a dedicated tunnel between the ONT and the OLT; and
transmitting EAP messages in a data path including EAP messages and non-EAP messages and extracting said EAP messages from the data path.

3. The method of claim 1, further comprising:
directing the entity authentication request to authenticator Port Access Entity (PAE) functionality at the ONT for enabling said authenticating the identity of the entity to be performed.

4. The method of claim 3 wherein:
said authenticating the identity of the entity and said transmitting said entity authentication confirmation are performed by at least one the OLT and an authentication server; and
transmitting the entity authentication request and transmitting said entity authentication confirmation each include at least one of transmitting Extensible Authentication Protocol (EAP) messages over a dedicated tunnel between the ONT and the OLT and transmitting EAP messages in a data path including EAP messages and non-EAP messages and extracting said EAP messages from the data path.

5. A Passive Optical Network (PON) comprising:
an Optical Network Terminal (ONT) including:
at least one data processing device;
memory connected to said at least one data processing device of the ONT;
an authentication server; and
an Optical Line Terminal (OLT) including at least one data processing device and memory connected to said at least one data processing device of the OLT wherein said OLT and said authentication server are adapted to facilitate authenticating the identity of an entity in cooperation wherein the OLT plays an active role in authenticating the identity of the entity; characterized in that said at least one data processing device of the ONT is adapted to inhibit transmission of non-authentication messages from the ONT until the identity of the entity seeking to send said non-authentication messages is authenticated; and said at least one data processing device of the ONT is further adapted to enable transmission of non-authentication messages from the ONT in response to receiving an entity authentication confirmation to an entity authentication request and wherein the entity, at the control of a supplicant, sends an EAP-Start Message for reception by the connected ONT;
in response to the ONT receiving the EAP-Start Message, the ONT sends an EAP-Request Identity Message for reception by the entity;
in response to the entity receiving the EAP-Request Identity Message, the entity sends an EAP-Response Message;
in response to the ONT receiving the EAP-Response Message, the ONT forwards the EAP-Response Message for reception by the OLT that serves the ONT;
the OLT receives the EAP-Response Message and then forwards the EAP-Response Message for reception by the authentication server;
the authentication server receives the EAP-Response Message and determines the identity authenticity of the supplicant;
if the identity of the supplicant is determined to be authentic, the authentication server sends an Accept Message for reception by the entity via the OLT and the ONT;
if the identity of the supplicant is determined to be non-authentic, the authentication server sends a Reject Message for reception by the entity via the OLT and the ONT;
in the case of the identity of the supplicant being determined to be authentic and the authentication server sending the Accept Message for reception by the entity via the OLT and the ONT, the OLT receives the Accept Message and then forwards the Accept Message for reception by the ONT and the ONT forwards the Accept Message for reception by the entity and enables transmission of non-EAP Messages at a controlled port of the ONT and the entity receives the Accept Message while the entity sends a Log-off Message for reception by the ONT at some point after the ONT enables transmission of non-EAP Messages to the controlled port of the ONT and in response to receiving the Log-off Message, the ONT inhibits transmission of non-EAP messages; and
in the case of the identity of the supplicant being determined to be non-authentic and the authentication server sending the Reject Message for reception by the entity via the OLT and the ONT, the OLT receives the Reject Message and forwards the Reject Message for reception by the ONT and the ONT forwards the Reject Message for reception by the entity.

6. The PON of claim 5 wherein transmitting the entity authentication request and transmitting said entity authentication confirmation each include at least one of:
transmitting Extensible Authentication Protocol (EAP) messages over a dedicated tunnel between the ONT and the OLT; and
transmitting EAP messages in a data path including EAP messages and non-EAP messages and extracting said EAP messages from the data path.

7. The PON of claim 5 wherein said at least one data processing device of the OLT is adapted to facilitate:
directing the entity authentication request to authenticator Port Access Entity (PAE) functionality at the ONT for enabling said authenticating the identity of the entity to be performed.

8. The PON of claim 5 wherein:
transmitting the entity authentication request and transmitting said entity authentication confirmation each include at least one of transmitting Extensible Authentication Protocol (EAP) messages over a dedicated tunnel between the ONT and the OLT and transmitting EAP messages in a data path including EAP messages and non-EAP messages and extracting said EAP messages from the data path.

9. A Passive Optical Network (PON), comprising:
an Optical Network Terminal (ONT) configured for providing controlled port operations of authenticator Port Access Entity (PAE) functionality; and
an Optical Line Terminal (OLT) configured for providing entity authentication operations of said authenticator Port Access Entity (PAE) functionality, wherein the OLT is connected to the ONT for enabling interaction therebetween and to an authentication server that cooperates with the OLT for providing entity authentication operations wherein the OLT plays an active role in providing entity authentication operations and wherein an entity, at the control of a supplicant, sends an EAP-Start Message for reception by the connected ONT;
in response to the ONT receiving the EAP-Start Message, the ONT sends an EAP-Request Identity Message for reception by the entity;
in response to the entity receiving the EAP-Request Identity Message, the entity sends an EAP-Response Message;
in response to the ONT receiving the EAP-Response Message, the ONT forwards the EAP-Response Message for reception by the OLT that serves the ONT;
the OLT receives the EAP-Response Message and then forwards the EAP-Response Message for reception by the authentication server;
the authentication server receives the EAP-Response Message and determines the identity authenticity of the supplicant;
if the identity of the supplicant is determined to be authentic, the authentication server sends an Accept Message for reception by the entity via the OLT and the ONT;
if the identity of the supplicant is determined to be non-authentic, the authentication server sends a Reject Message for reception by the entity via the OLT and the ONT;
in the case of the identity of the supplicant being determined to be authentic and the authentication server sending the Accept Message for reception by the entity via the OLT and the ONT, the OLT receives the Accept Message and then forwards the Accept Message for reception by the ONT and the ONT forwards the Accept Message for reception by the entity and enables transmission of non-EAP Messages at a controlled port of the ONT and the entity receives the Accept Message while the entity sends a Log-off Message for reception by the ONT at some point after the ONT enables transmission of non-EAP Messages to the controlled port of the ONT and in response to receiving the Log-off Message, the ONT inhibits transmission of non-EAP messages; and in the case of the identity of the supplicant being determined to be non-authentic and the authentication server sending the Reject Message for reception by the entity via the OLT and the ONT, the OLT receives the Reject Message and forwards the Reject Message for reception by the ONT and the ONT forwards the Reject Message for reception by the entity.

10. The PON of claim 9 wherein said controlled port operations of authenticator Port Access Entity (PAE) functionality includes:

inhibiting transmission of non-authentication messages from the ONT until an identity of the entity seeking to send said non-authentication messages is authenticated; and enabling transmission of non-authentication messages from the ONT in response to receiving an entity authentication confirmation to the entity authentication request.

11. The PON of claim 10 wherein transmitting the entity authentication request and transmitting said entity authentication confirmation each include at least one of:

transmitting Extensible Authentication Protocol (EAP) messages over a dedicated tunnel between the ONT and the OLT; and transmitting EAP messages in a data path including EAP messages and non-RAP messages and extracting said EAP messages from the data path.

12. The PON of claim 10 wherein said entity authentication operations of said authenticator PAE functionality include:

directing the entity authentication request to authenticator Port Access Entity (PAE) functionality for enabling said authenticating the identity of the entity to be performed.

13. The PON of claim 12 wherein transmitting the entity authentication request and facilitating transmission of said entity authentication confirmation each include at least one of:

transmitting Extensible Authentication Protocol (EAP) messages over a dedicated tunnel between the ONT and the OLT; and transmitting EAP messages in a data path including EAP messages and non-EAP messages and extracting said EAP messages from the data path.

* * * * *